United States Patent [19]
Tajbl et al.

[11] 3,803,382
[45] Apr. 9, 1974

[54] WELDING CURRENT SOURCE

[75] Inventors: Franz Tajbl, D-Oberschleissheim; Erwin Kolbl, Munich, both of Germany

[73] Assignee: Messer Griesheim GmbH, Frankfurt/Main, Germany

[22] Filed: Apr. 18, 1972

[21] Appl. No.: 245,205

[30] Foreign Application Priority Data
  Apr. 20, 1971  Germany............................ 2119135

[52] U.S. Cl.................. 219/135, 219/131 R, 323/24
[51] Int. Cl............................................... B23k 9/10
[58] Field of Search ............ 219/135, 131 R, 131 F; 307/75; 323/23, 24, 75

[56] References Cited
UNITED STATES PATENTS

| | | |
|---|---|---|
| 3,475,673 | 10/1969 | Striggow .......................... 323/25 X |
| 3,641,311 | 2/1972 | Hildebrandt et al................ 219/135 |
| 3,646,439 | 2/1972 | Broski............................... 323/24 X |
| 3,546,424 | 12/1970 | Howie, Jr........................... 219/131 |
| 3,564,333 | 2/1971 | Cramer et al.................. 219/135 X |
| 3,627,977 | 12/1971 | Aldenhoff........................... 219/131 |
| 3,617,696 | 11/1971 | Reenstra............................. 323/24 |
| 3,643,405 | 2/1972 | Vukasouic et al............... 323/23 X |
| 3,609,515 | 9/1971 | Babcock.......................... 323/24 X |

*Primary Examiner*—J. V. Truhe
*Assistant Examiner*—Gale R. Peterson
*Attorney, Agent, or Firm*—Connolly and Hutz

[57] ABSTRACT

An arc welding current source in which two rectifiers are connected in antiparallel relationship in the current output circuit to provide A.C. potential to the welding electrode, one of the rectifiers being automatically switched off during idling to provide D.C. potential at the electrode whereby current to the electrode is continuously maintained during the switch from A.C. to D.C.

11 Claims, 7 Drawing Figures

WELDING CURRENT SOURCE

BACKGROUND OF THE INVENTION

The invention relates to a welding current source for arc welding with alternating current, particularly for welding in confined spaces, with a welding current transformer and a welding circuit connected to the secondary winding of the latter.

In alternating current arc welding, by either the gas-shielded or the plasma method, the open-circuit alternating voltage, which is applied between exposed touchable parts, for example between the welding electrode and the workpiece, and which is used for ignition, must not for safety reasons exceed an effective value of 70 V when the arc is not burning.

In welding within confined spaces, for example in boilers or pipes, the safety regulations are still stricter. In such cases an effective voltage of 42 V must not be exceeded when the arc is not burning. Any higher voltage which may occur must be reduced to an effective voltage of 42 V within a period of 0.2 second. Compliance with the safety regulations is on the one hand absolutely indispensable in order to protect the welder, but on the other hand has the disadvantage that reliable ignition of the arc without contact is possible only with great difficulty. This disadvantage occurs to a particularly great extent in the case of welding with low welding currents, for example under 25 A and/or when filter capacitors are used in the welding circuit.

For the purpose of avoiding these disadvantages various welding current sources have already been developed, but these still do not provide the desired reliability together with the simple construction necessary for inexpensive mass production. This, for example, welding current sources are known which supply alternating current for welding and direct current for ignition, but in which it is necessary to switch over from one voltage to the other. This switching-over however has a disadvantage which seriously impairs perfect welding, namely that on each occasion no voltage is available at the arc path for a short time, so that during this time the arc cannot burn.

The problem underlying the invention consists in developing a welding current source in which the disadvantages indicated above are avoided and which in particular is in the form of an especially simple and operationally reliable protective circuit arrangement.

SUMMARY OF THE INVENTION

This problem is solved by disposing in the welding circuit two rectifiers which are connected in antiparallel and of which one can be switched off when the welding circuit is idling. Since the welding circuit is then idling, on the extinction of the arc the rectifier adapted to be switched off is automatically switched off, whereby, depending on the polarity of this rectifier, either the positive or the negative half-waves of the welding alternating voltage are disconnected and a direct current voltage is produced. The transition from alternating voltage to direct voltage is made continuously and there is no longer, as was previously the case, a short period during which no voltage is supplied by the welding currect source to the arc path. Thus, direct current voltage is promptly available for igniting the arc, so that more reliable ignition without contact is possible in an advantageous manner, as compared with idling alternating currents, than was hitherto the case. The higher the direct current voltage, the simpler and more reliable the ignition of the arc will be. Since safety regulations permit an idling direct current voltage of a maximum of 100 V for welding, including welding in confined spaces, the welding current source according to the invention provides the special advantage that for alternating current welding a higher ignition voltage than the maximum hitherto permissible can be used without violating safety regulations. The two rectifiers connected in antiparallel serve in this respect as a protective circuit arrangement. In gas-shielded welding it is for this purpose simply necessary to adjust the welding current transformer to supply an idling alternating current voltage of 70 V or 42 V eff. to the arc path.

In the case of plasma welding, utilizing a resistor to produce an auxiliary arc between the welding electrode and a gas nozzle surrounding the latter, the welding current transformer can be so adjusted that it will supply during idling a higher voltage than 70 V eff. In contrast to shielded arc welding, in the plasma welding process the welding electrode cannot be touched, since the gas nozzle has a very small opening, for example with a diameter of 1.6 mm. On the other hand, because of the resistor connected to the gas nozzle for the purpose of producing the auxiliary arc, the welder is in danger if he should touch the gas nozzle. The voltage between the gas nozzle and the workpiece should therefore not exceed the prescribed values of 70 V or 42 V eff. for alternating voltage and 100 V for direct voltage. This can be achieved by suitably dimensioning the resistor.

The advantage of the protective circuit arrangement according to the invention is particularly important in the case of alternating current welding in confined spaces, because the difference between the maximum permissible idling alternating voltage of 42 V eff. and the idling direct voltage of 100 V (peak value) which can now be used according to the invention is particularly great; this is also true even when it is borne in mind that an effective voltage of 42 V corresponds to a peak voltage of 59 V, since in the process according to the invention the ignition voltage is nevertheless still 41 V, that is to say about 70 percent, higher than the hitherto permissible peak voltage of 59 V.

The welding current source according to the invention can be used with particular advantage for alternating current plasma welding.

The ignition of the arc is in addition favorably influenced if the positive potential of the direct current voltage is applied to the welding electrode. This is particularly the case if the protective gas used in argon. Welding with basic lime welding electrodes can also be improved with the welding current source according to the invention.

Another advantage of the welding current source consists in that on the extinction of the arc either the positive or the negative half-waves of the welding alternating voltage are automatically disconnected and reconnected after ignition of the arc. Thus, on every interruption of the arc a pulsating direct current voltage is produced for ignition. After ignition the alternating current is available again for welding.

It is particularly important that the pulsating direct current formed by the half-waves not disconnected is converted into a substantially constant direct current voltage. By this means, in consequence to the higher energy fed into the arc path in comparison with a weakly or even strongly pulsating direct current voltage, better ionization of the arc path and consequently better ignition of the arc are achieved. This is particularly important also when welding with samll currents, especially under 25 A.

The production of a substantially constant direct current voltage is achieved in an advantageous manner through the fact that the output poles of the welding current source are connected by a smoothing element, preferably consisting of a smoothing resistor and a smoothing capacitor connected in series with the latter. An effective ignition pulse, which additionally promotes ignition, is taken direct from the smoothing capacitor on ignition of the arc.

It is advantageous for the disconnectable rectifier to be a controllable rectifier, preferably a rectifier, controlled, semiconductor — which is a three-terminal PNPN semiconductor or switch. Its construction is similar to the PNPN diode except that an ohmic connection is made to the isolated P region. The insertion of a pulse of current into this region causes this device to switch from its high impedance "off" state to a very low impedance "on" state, thue allowing control of current, such as in a thyratron. Such a semiconductor device for use as the controllable rectifier in this invention is sold under the name Thyristor by Motorola Semiconductor Products, Inc., Phoenix, Arizona. The controllable rectifier may also for example be of the vacuum tube type, such as a thyratron. When a Thyristor is used, it must be insured that when the current falls below its holding current, and in particular on each occasion after the welding alternating current passes through zero, ignition pulses are supplied to it.

An advantageous further development of the welding current source consists in that the ignition electrode of the Thyristor is connected to a Thyristor triggering means which on the input side is connected to a choke disposed in the welding circuit, preferably an adjustable choke. The voltage drop in the adjustable choke on the flowing of the welding current is thus utilized in a simple manner to control the Thyristor triggering means. When the arc is extinguished, the voltage at the adjustable choke sinks to zero value, since no welding current now flows. The Thyristor then switches over into the non-conductive state and according to the invention direct current voltage is applied to the art path. After ignition of the arc a current flows in the welding circuit and in the choke produces a voltage drop. This voltage drop has the effect that the Thyristor triggering means transmits an ignition pulse to the Thyristor, which thus becomes conductive. The welding alternating current then flows in the welding circuit. Instead of a reduction of voltage in the choke, the triggering means may also be controlled for the same purpose with the aid of a current relay disposed in the welding circuit.

In comparison with rectifiers which can be disconnected purely mechanically, the use of controllable rectifiers provides the advantage of smaller time constants. When passing over from welding operation to idling operation, one half-wave of the alternating voltage must, because of the previously mentioned safety regulations, be interrupted so quickly that during the idling of the welding circuit an alternating voltage occurs at the most for a period of 0.2 second, but advantageously for the duration of only a few half-waves, with a frequency of 50 c/s or 50 Hz. In addition, in contrast to mechanical switches, controllable rectifiers are not subject to wear.

When mechanically disconnectable rectifiers are used, it is convenient for a switch, which is adapted to be switched by a relay controlled by the welding currents, to be connected directly to the disconnectable rectifier. When the arc is not burning, the relay holds the switch open, so that the direct current voltage is applied to the arc path. After ignition of the arc, a current begins to flow which through the relay closes the switch and thus switches on the disconnectable rectifier, and accordingly the welding circuit. The welding alternating current can consequently now flow.

The welding current source according to the invention can also be used in those cases in which a high frequency or impulse ignition apparatus is used. This is particularly the case in plasma welding, where the energy taken from the ingnition device is used to produce a pilot arc between the welding electrode and a gas nozzle. In such a case the welding current source has connection terminals for the connection of a high frequency or impulse ignition device. A disconnecting capacitor is advantageously connected at least between one of the connection terminals and the ignition device. Through the disconnection capacitor the direct current voltage is disconnected from the ignition device when the arc is not burning. If a disconnecting capacitor is not used the ignition device would be damaged.

It is convenient for the welding current source to be adapted to be disconnected by a switch which is controllable by a relay connected in parallel to the arc path. This switch, which is advantageously in the form of a contactor, insures that in the event of the failure of the controllable rectifiers the welding current source is switched off within one second in accordance with safety regulations.

BRIEF DESCRIPTION OF THE DRAWINGS

Novel features and advantages of the present invention will become apparent to one skilled in the art from a reading of the following description in conjunction with the accompanying drawings wherein similar references characters refer to similar parts and in which.

DESCRIPTION OF THE PREFERRED EMBODIMENTS

Figure 1:
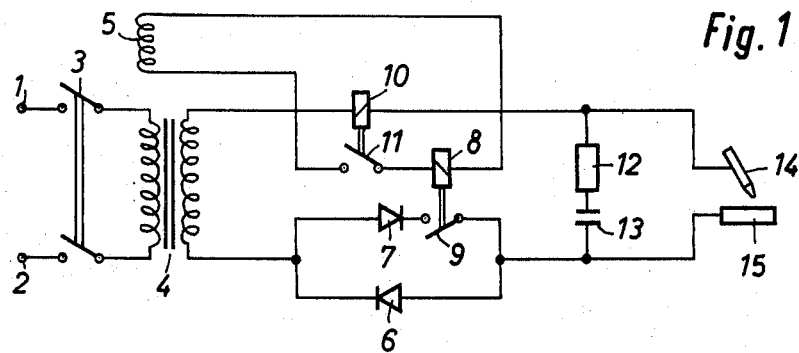
FIG. 1 is a schematic diagram of a circuit arrangement for a welding current source for arc welding which is one embodiment of this invention.

The circuit arrangement illustrated in FIG. 1 consists of a welding current transformer 4, of which the primary winding is connected through a two-pole main switch 3, which is advantageously in the form of a contactor, to the pole terminals 1 and 2 of an alternating current supply. The transformer 4 is in the form of an adjustable leakage core transformer for adjusting the desired welding current intensity. One end of the secondary winding of the transformer 4 is connected through a relay 10 to a welding electrode 14. The other end of the secondary winding of the transformer 4 is connected to a workpiece 15 through two rectifiers 6 and 7 connected in antiparallel. A switch 9, by which the rectifier 7 is adapted to be switched off, is inserted in the circuit of the rectifier 7. The switch 9 is switched by a relay 8, which together with another switch 11 and a voltage source 5 forms a circuit. The voltage source 5 consists of a special primary winding of the welding current transformer 4. The switch 11 is switched by the relay 10 in the welding current circuit. A smoothing element is disposed in parallel to the arc path, which lies between the welding electrode 14 and the workpiece 15. This smoothing element consists of a smoothing resistor 12 and a smooth capacitor 13 connected in series with the latter.

When the two-pole main switch 3 is closed, an alternating voltage, for example 70 V eff., is applied to the secondary winding of the transformer 4. Since the switch 9 is open when the arc is not burning between the electrode 14 and the workpiece 15, a smoothed direct voltage of about 98 V is applied to the arc path for the purpose of igniting the arc. The values of the smoothing resistor 12 and of the smoothing capacitor 13 should be so proportioned that the time constant formed by the two values is high in relation to the period of oscillation of the main voltage taken from the pole terminals 1 and 2. After the arc has been ignited there flows in the welding circuit a current which closes the switch 9 through the relays 10 and 8. A welding alternating current can thus now flow in the welding circuit.

In this special example of a circuit arrangement the rectifier 7 is switched on with the aid of two relays 10 and 8 and of two switches 9 and 11 after the arc has been ignited. Particularly in the case of small welding currents, it is also possible to omit the voltage source 5, the switch 11, and the relay 8 and to control the switch 9 direct by means of the relay 10 in the welding circuit.

Figure 2:
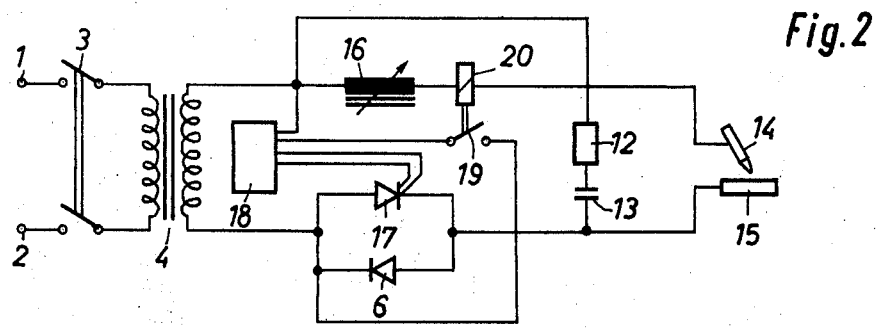
FIG. 2 is a schematic diagram of a circuit arrangement for a welding current source for arc welding which is another embodiment of this invention.

FIG. 2 likewise shows a welding current transformer 4, the primary winding of which is connected through a two-pole main switch 3 to the pole terminals 1 and 2 of a current supply system. The secondary winding of the transformer 4 is connected on the one hand through an adjusting choke 16 for regulating the welding current and a relay 20 to the welding electrode 14, and on the other hand through two semiconductor rectifiers 6 and 17, connected in antiparallel, to the workpiece 15. The rectifier 17 is a Thyristor, the ignition electrodes of which are connected to a Thyristor triggering means 18. The workpiece 15 is connected through a smoothing capacitor 13, and through a smoothing resistor 12 connected in series with the latter, to the end of the secondary winding of the transformer 4 which in turn is connected to the adjusting choke 16. The relay 20 controls a switch 19 one end of which is connected by the Thyristor triggering means 18 to that end of the secondary winding of the transformer 4 which is connected to the two rectifiers 6 and 17 connected in antiparallel.

When the two-pole main switch 3 is closed, an idling alternating voltage of for example 70 V eff. is applied to the secondary winding of the transformer 4. When the arc is not burning, not current flows in the welding circuit and the Thyristor 17 is blocked. Thus an idling direct current voltage of, for example, about 100 V exists between the welding electrode 14 and the work piece 15, and this voltage ignites the arc between the welding electrode 14 and the workpiece 15. After ignition of the arc, the switch 19 is closed by the relay disposed in the welding circuit, so that the Thyristor triggering means 18 applies ignition pulses to the two ignition electrodes of the Thyristor 17. Through these ignition pulses the Thyristor 17 is ignited. There upon a welding alternating current flows and the welding alternating voltage is applied to the arc path. In the event of the accidental extinction of the arc, the welding alternating current ceases to flow and the Thyristor 17 is blocked. As a consequence, the direct current voltage is again applied for the purpose of igniting the arc between the welding electrode 14 and the workpiece 15. In order to prevent the Thyristor 17 from blocking whenever the welding alternating current passes through zero, on each passage of the welding alternating current through zero, the Thyristor triggering means 18 automatically transmits ignition pulses to the ignition electrodes of the Thyristor 17.

Figure 3:
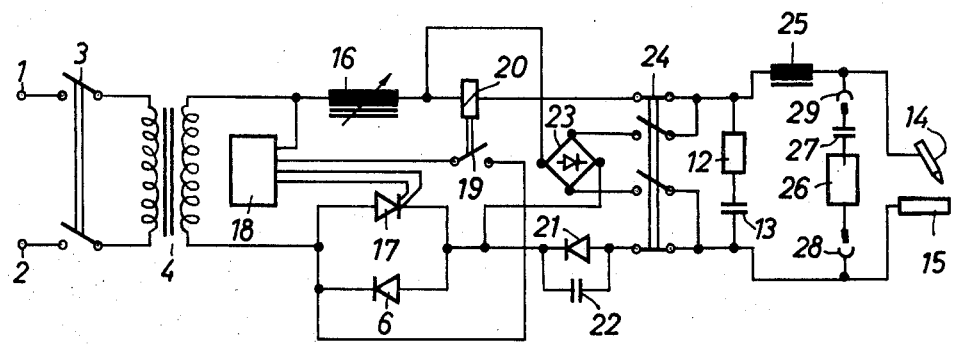
FIG. 3 is a schematic diagram of a circuit arrangement for a welding current source for arc welding which is still another embodiment of this invention.

The example of a circuit arrangement illustrated in FIG. 3 coincides to a great extent with the example illustrated in FIG. 2. However, the switch point of the smoothing resistor 12, which is remote from the smoothing capacitor 13, is situated between the adjusting choke 16 and the welding electrode 14, in the welding circuit.

Moreover, between the relay 20 and the smoothing element 12-13 a two-pole change-over switch 24 is inserted in the welding circuit. The two switch-over poles of the two-pole change-over switch 24 are adapted to be connected to the two output poles of a rectifier bridge 23. One input pole of the rectifier bridge 23 is inserted in the welding circuit between the adjustable choke 16 and the relay 20 and the second input pole of the rectifier bridge 23 between the two-pole change-over switch 24 and the two rectifiers 6 and 17 connected in antiparallel. Between the switch point of the second input pole of the rectifier bridge 23 in the welding circuit and one pole, situated in the welding circuit, of the two-pole change-over switch 24 there is inserted a diode 21, which is bridged over by a filter capacitor 22. The filter capacitor 22 serves to suppress an undesirable direct current component in the welding alternating current. The diode 21 serves to improve the ignition when the welding electrode 14 and workpiece 15 are cold, and its poles are so arranged that the direct current voltage produced in accordance with the invention is passed through when the arc is not burning. In addition, connection terminals 28 for the connection of a high frequency or impulse ignition device are disposed, in parallel with the arc, in the welding circuit between the smoothing element 12-13 and the welding electrode 14 or the workpiece 15 respectively. An impulse ignition device 26 is connected to the two connection terminals 28 and 29, while a disconnecting capacitor 27 is connected between the connection terminal 29 and the ignition device 26. The disconnecting capacitor 27 prevents direct current voltage from reaching the ignition device 26 when the arc is not burning. A high frequency choke 25 in the welding circuit insures that the high frequency from the ignition device 26 is fed only into the arc path and not into the remainder of the circuit.

Because of the filter capacitor 22 the circuit arrangement illustrated in FIG. 3 is particularly suitable for shielded arc welding with non-consumable electrode, particularly with a tungsten electrode. In addition, this circuit arrangement is suitable for universal use, since with the aid of the two-pole change-over switch 24 it can be switched over from welding with alternating current to welding with direct current.

The impulse ignition device 26 serves to support the ignition operation, particularly in direct current welding. It is automatically switched on when the arc is extinguished, and it automatically applies direct current to the arc path. After ignition of the arc, it is automatically switched off again. The remainder of the functioning of the circuit arrangement shown in FIG. 3 corresponds to that described in connection with FIG. 2.

Figure 4:
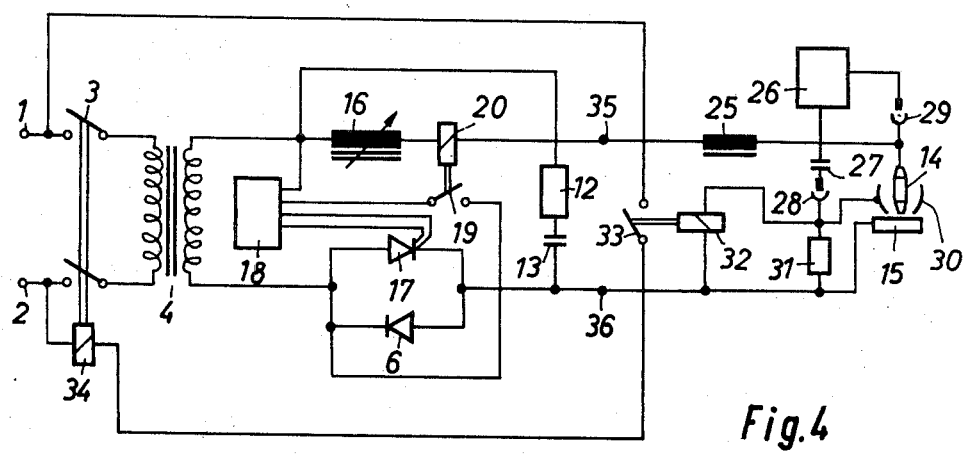
FIG. 4 is a schematic diagram of a circuit arrangement for a welding current source for plasma welding which is a further embodiment of this invention.

FIG. 4 illustrates a circuit arrangement for plasma welding with alternating current. Except for some additional switching elements, this circuit arrangement corresponds to that described in FIG. 2. The additional switching elements consist of the following:

With the aid of two connection terminals 28 and 29, an impulse ignition device 26 is connected to the welding electrode 14 and to a gas nozzle surrounding the latter and supplying the working gas. Between the connection terminals 28 and the impulse ignition device 26 a disconnection capacitor 27 is connected. In addition, the gas nozzle 30 is connected to the workpiece 15 through a low-resistance resistor 31 in known manner for the purpose of producing an auxiliary arc. The resistor 31 is bridged over by a relay 32, which actuates a switch 33. One pole of the switch 33 is connected to the pole terminal 1 of the supply system and the second pole of the switch 33 is connected through a relay 34 to the pole terminal 2 of the supply system. The relay 34 switches the two-pole main switch 3. A high frequency choke 25 is inserted in the welding circuit between the connection terminal 29 and the relay 20. The resistor 31 is so dimensioned that when the welding current transformer 4 supplies an idling alternating current of 160 V eff., an idling direct current voltage of at most 100 V exists between the gas nozzle 30 and the workpiece 15. A further part of the voltage drops off through the resistor 31 and the auxiliary arc.

The circuit arrangement shown in FIG. 4 functions as indicated in connection with FIG. 2. In addition, when because of a defect, for example the failure of the Thyristor 17, the maximum direct or alternating voltages permitted by the safety regulations are exceeded, the main switch 3 is switched off by means of the relays 32 and 34. The main switch 3 is switched off within the permitted time of one second.

Figure 5:
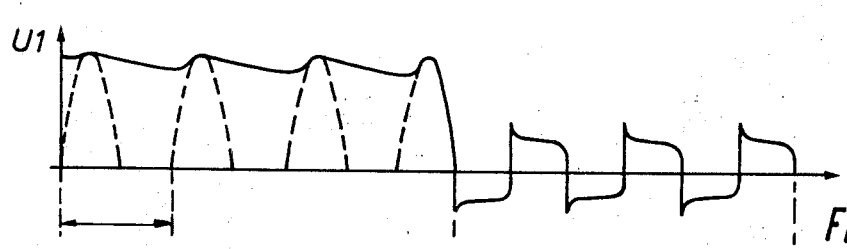
FIGS. 5–7 show current and voltage characteristics for the welding current source shown in FIG. 4; in which the time $t$ is plotted on the abscissae and the voltages "U" and currents "I" on the ordinates. Identical points of time on the abscissae in FIGS. 5–7 are designated by broken lines extending perpendicularly to the abscissae.

The time characteristic of a voltage U1, which is taken off at the measurement points 35 and 36 in the circuit arrangement shown in FIG. 4, is illustrated in FIG. 5. The measurement point 35 is situated between the relay 20 and the high frequency choke 25 in the welding circuit, and the measurement point 36 between the connection points of the smoothing capacitor 13 and of the relay 32 in the welding circuit.

In the left-hand part FIG. 5 shows the smoothed direct current voltage existing between the welding electrode 14 and workpiece 15 with a frequency of 50 c/s when the arc is not burning, and in the right-hand part shows the distorted welding alternating voltage after ignition of the arc. In the left-hand part the characteristic of the rectified idling alternating voltage, from which the smoothed direct voltage is produced, is shown in broken lines.

Figure 6:
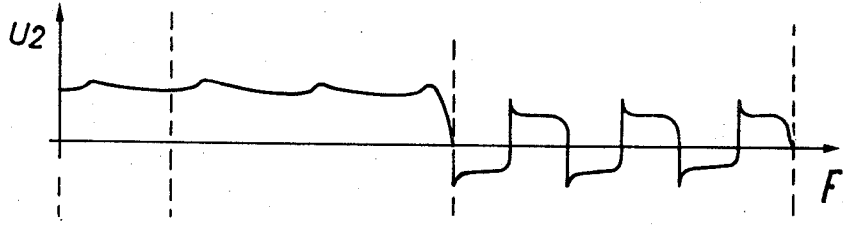

In FIG. 6 is shown the time characteristic of the voltage U2 taken off through the resistor 31. In the left-hand part the characteristic of this voltage is shown when the arc is not burning but the auxiliary arc is burning between the welding electrode 14 and the gas nozzle 30. In the right-hand part of FIG. 6 the voltage measured at the resistor 31, which is produced after ignition of the arc, is shown.

When welding is effected with transmitted arc and the auxiliary arc is switched off, the voltage U2 drops to zero.

Figure 7:
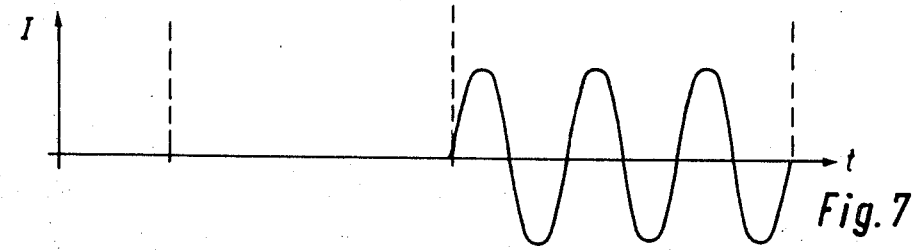

FIG. 7 shows the characteristic of the welding current I. In the left-hand part of this figure, where the time duration corresponds to that of the smoothed direct current voltage shown in FIG. 5, the welding current has the value zero — while after ignition of the arc it has an approximately sinusoidal characteristic. This characteristic is illustrated in the right-hand part of FIG. 7.

The rectifiers 6, 7, 17, and 21 used in the examples of embodiment illustrated in FIGS. 1 to 4 are power rectifiers which are suitable for switching high welding currents. In addition, the polarities of the rectifiers 6, 7, 17, and 21 are so arranged that when the arc is not burning, that is to say during the idling of the welding circuit, the positive potential of the direct current voltage is applied to the welding electrode 14. The following values are given as examples for each of the corresponding numbered electrical components shown in the indicated figures:

| | |
|---|---|
| FIG. 1 | |
| Transformer 4 | — 200 A; no-load-voltage 60 – 80 $V_{eff}$. Duration of operation 60–100%. 12–16 KvA |
| Rectifier 6 | — standard type 120 A; 125 V. |
| Rectifier 7 | — standard type 120 A, 125 V |
| Voltage source 5 | — 12 – 110 V — AC |
| Resistor 12 | — 5–20 ohm |
| Capacitor 13 | — 4 – 32 µ F; 250 V – DC |
| FIG. 2 | |
| Transformer 4 | — 350 A; no-load-voltage 60–80 $V_{eff}$. Duration of operation 60–100%. 20–28 KvA |
| Rectifier 6 | — standard type 215 A, 125 V |
| Resistor 12 | — 5 – 20 ohm |
| Capacitor 13 | — 4 – 32 µ F; 250 V — DC |
| Choke 16 | — Resistor (inductive) 0,14–1,25 ohm |
| Thyristor 17 | — standard type — mind. 50 A |
| Tiggering Means 18 | — electronic switch type trigger (standard type) |
| FIG. 3 | |
| Transformer 4 | — 550 A; no-load-voltage 60– 80 $V_{eff}$. Duration of operation 60–100%, 33–44 KvA |
| Rectifier | 6 — standard type 330 A; 125 V. |
| Resistor 12 | — 5 – 20 ohm |
| Capacitor 13 | — 4– 32 µ F; 250 V — DC |
| Choke 16 | — Resistor (inductive) 0.09–1,25 ohm |
| Thyristor 17 | — standard type — mind. 50 A |
| Tiggering Means 18 | — electronic switch type trigger |

| | |
|---|---|
| Diode 21 | (standard type<br>— standard type (Si or Se-basis) mind. 185 A. |
| Capacitor 22 | — 140.000 – 210.000 μ F. |
| Rectifier Bridge 23 | — standard type — 550 A; 125 V |
| Choke 25 | — mind. 10 μ H |
| Ignition Device 26 | — H.F.-generator - standard type |
| Capacitor 27 | — mind. 1 μ F |
| FIG. 4 | — 200 A; no-load-voltage 60–80V_eff.<br>Duration of operation 60–100 %; 12–16 KvA |
| Rectifier 6 | — standard type 120 A; 125 V. |
| Resistor 12 | — 5 – 20 ohm |
| Capacitor 13 | — 4 – 32 μ F; 250 V-DC |
| Choke 16 | — Resistor (inductive) 0,25–2,5 ohm |
| Thyristor 17 | — standard type — 50 A |
| Tiggering Means 18 | — electronic switch type trigger (standard type) |
| Choke 25 | — mind. 10 μ H |
| Ignition Device 26 | — H.F. -generator — standard type |
| Capacitor 27 | — mind b 1 μ F. |
| Resistor 31 | — 4,8 – 6,6 ohm. |

We claim:

1. An arc welding system having a current source for supplying current to an arc welding electrode, the improvement in said current source comprising a welding current transformer, a welding current output circuit connected to the secondary winding of the transformer, characterized in that two rectifiers are connected in antiparallel in the welding current output circuit for providing an alternating current to the welding electrode, and a switching means is connected to one of the rectifiers responsive to presence and absence of welding current in the welding current output circuit for switching said one of the rectifiers off during the idling of the welding current output circuit and leaving the other of the rectifiers operating during the idling to provide a direct current potential in the welding current output circuit during idling for facilitating ignition of the welding arc and for switching said one of said rectifiers on and maintaining it on when current is flowing in the welding current output current whereby the welding current to the electrode is continuously maintained during the transition from a direct current to an alternating current.

2. An arc welding system according to claim 1, wherein the welding current output current has output poles, and an energy storing smoothing element being connected across the output poles.

3. An arc welding system according to claim 2, wherein the smoothing element comprises a smoothing resistor and a smoothing capacitor connected in series with each other.

4. An arc welding system according to claim 1 wherein the disconnectable rectifier comprises a controllable rectifier.

5. An arc welding system according to claim 4 wherein the controllable rectifier comprises a semiconductor.

6. An arc welding system according to claim 5 wherein the controllable, rectified, semiconductor comprises a Thyristor.

7. An arc welding system according to claim 6 wherein the Thyristor has an ignition electrode, a Thyristor triggering means is connected to the ignition electrode, a choke is connected in the welding current output circuit and the input side of the trigger means is connected to the choke.

8. An arc welding system as set forth in claim 7 wherein the choke comprises an adjustable choke.

9. An arc welding system according to claim 1 wherein the switching means is a relay-operated switch connected to be controlled by the welding current, and the relay-operated switch is connected directly to the disconnectable rectifier.

10. An arc welding system according to claim 1 wherein the welding current output circuit has connection terminals for connecting a high frequency or impulse ignition device, and a disconnecting capacitor being connected at least between one of the connection terminals and the high frequency or impulse device.

11. An arc welding system according to claim 1 wherein a shut-off switch is connected to the welding current output circuit for switching off the current source, a relay being connected to the shut-off switch, and the relay being connected in parallel with the arc path across the output of the welding current output circuit.

* * * * *